Sept. 29, 1959     R. C. PALMER     2,906,916

POSITION SENSING DETECTOR

Filed March 27, 1958

INVENTOR.
RICHARD C. PALMER

BY *Darby + Darby*

ATTORNEYS

United States Patent Office 2,906,916
Patented Sept. 29, 1959

2,906,916
POSITION SENSING DETECTOR

Richard C. Palmer, Pompton Plains, N.J., assignor to Allen B. Du Mont Laboratories, Inc., Clifton, N.J., a corporation of Delaware Application March 27, 1958, Serial No. 724,441

2 Claims. (Cl. 315—11)

This invention relates in general to position sensing detectors and more particularly to improvements in position sensing detectors using photo multipliers.

My invention is a position sensing detector that can be used in conjunction with a preceding image converter to present an image that is accurately located with respect to the viewing device.

In missile guidance, for example, it is extremely important for the missile to constantly "know" where the target is and to be able to continuously correct for any deviation. The present invention may be placed in the nose of a missile and the information derived therefrom may be used to guide the missile in its flight toward the target. Evasive actions by the target or any changes in the flight path of either the missile or the target are immediately detected by my invention and the resultant correction voltage, derived as a result of detection, may be fed back to the flight controls of the missile thereby causing the missile to assume the correct "on target" course.

In addition, the same correction voltage information can be fed back to a central plotting board and the flight of the missile with regard to the target may be observed. In this instance, correction voltages may be fed from the plotting board to the missile to correct for deviations in flight of either the missile or the target.

It is therefore an important object of this invention to provide an accurate, fast acting position sensing detector.

Another object of the present invention is to provide a position sensing detector capable of generating information in the form of correction voltages to be applied to the control surfaces of a missile to change its flight path and correct for deviations in course.

A further object of the present invention is to provide a position sensing detector capable of generating information to be used at a site remote from the detector.

A still further object of this invention is to accomplish the aforementioned objects by means of a simple, light-weight structure.

Figure 2:
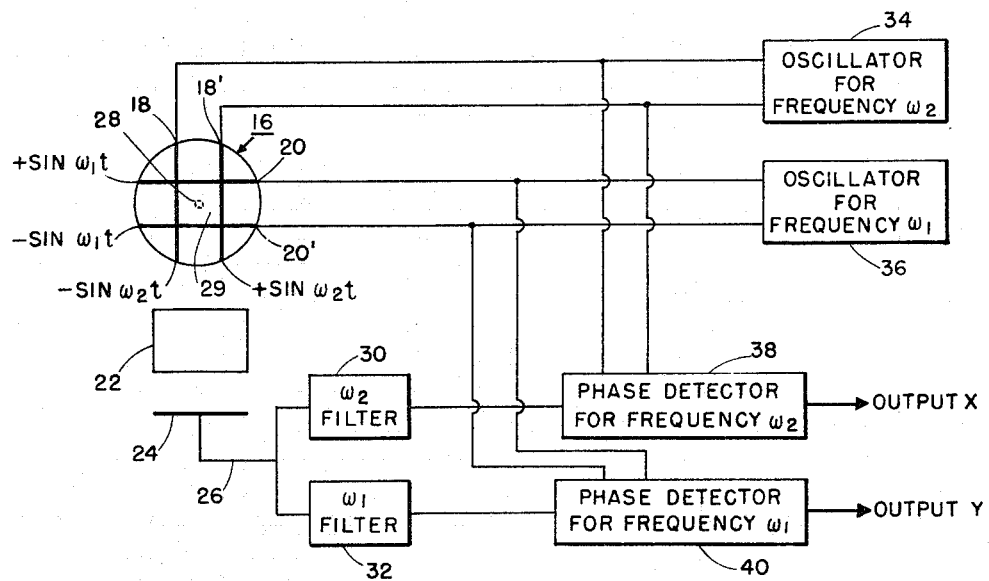
Figure 3:
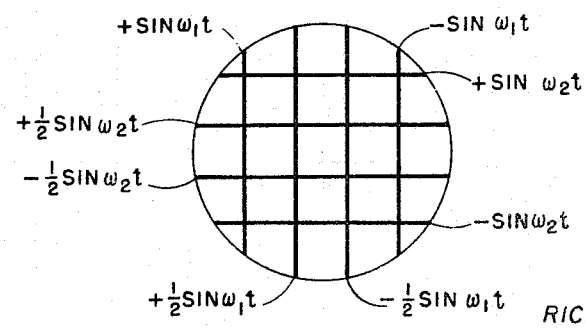

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawings in which, Fig. 1 represents an expanded diagrammatic representation of the viewing device utilized with my invention;

Fig. 2 represents in block diagram, the simplest embodiment of my invention; and Fig. 3 represents a still further embodiment of my invention using a greater number of grid wires to improve the resolution.

Figure 1:
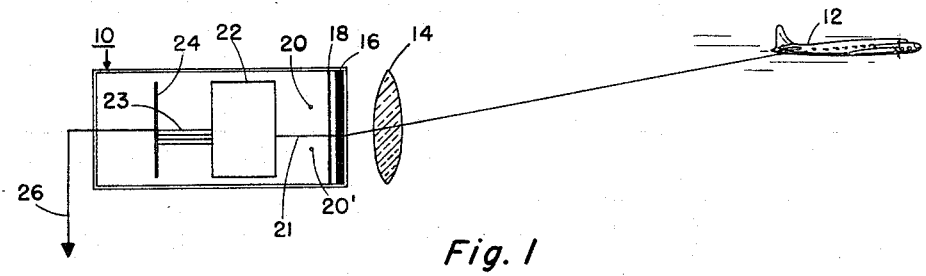

In Fig. 1 my viewing device comprises evacuated envelope 10 which contains at one end thereof an electron emitting screen or cathode 16. Adjacent the cathode and in spaced parallel relationship therewith are parallel grid electrodes 18, 18' (not shown). Parallel grid electrodes 20 and 20' are perpendicularly disposed with respect to grid electrodes 18, 18' in an adjacent plane. Adjacent, and spaced apart from electrodes 20 and 20' are a series of electron multiplier stages 22 which are similar to the electron multiplier stages used in the Du Mont type 6292 photomultiplier tube. However, it should be understood that it is not necessary to restrict the multiplier stages to the type 6292 since any one of many other well known electron multiplier structures may be used. Following electron multiplier stages 22 are anode 24 and lead 26 connected thereto. Although only lead 26 is shown it should be understood that the elements contained in envelope 10 are usually connected to pins at the end of the evacuated envelope in a manner well known to those skilled in the vacuum tube art.

With this device, any light reflected from target 12 is collected and focused by optical system 14 and is projected onto cathode 16 as an image. Cathode 16 represents well known cathodic material that emits a beam or stream of electrons 21 from the cathode area on which the projected image falls. The material of cathode 16 may be of the type that emits electrons from the image area when the background is very dark by comparison to the image or, as another possibility, emits electrons when the image projected thereon is only slightly lighter than the surrounding background.

If now different modulating signals are applied to the various electrodes the beam current of the device can be made to carry a plurality of alternating current components representative of the area on the cathode from which the emission originated.

Any beam current generated on cathode 16 passes between electrodes 18, 18' and 20, 20' then passes through and is amplified by the electron multipliers indicated at 22. The amplified beam current 23 is collected at anode 24 and connected to subsequent stages through line 26. Cathode 16, electrodes 18, 18', 20, 20', electron multiplier 22 and anode 24 are all enclosed in evelope 10 which is usually evacuated.

In the embodiment of Fig. 2, oscillators 34 and 36 generate frequencies $w_2$ and $w_1$ respectively. These oscillators may be either the crystal controlled Pierce type or a variable frequency Hartley type. A modulation signal at frequency $w_2$, generated by oscillator 34, is applied to electrode 18', and a similar signal of opposite polarity is applied to electrode 18. A modulation signal at frequency $w_1$, generated by oscillator 36, is applied to electrode 20 and a similar signal of opposite polarity is applied to electrode 20'. Parallel grid electrodes 18, 18' are positioned perpendicularly with respect to parallel grid electrodes 20, 20' and are spaced apart from cathode 16. By arranging the electrodes in this manner, the projection of the electrodes onto cathode 16 defines a section 29 which is bounded by electrodes 18, 18', 20 and 20'. Thus a signal on a grid wire may then be impressed as a modulation on beam current 21 originating from within area 29 when the beam current passes near that electrode. Cathode 16, electrodes 18, 18', 20 and 20', multiplier 22, anode 24 and line 26 occupy the same relative positions as indicated in Fig. 1. However, line 26 supplies the output from anode 24 to filters 30 and 32. The outputs of filters 30 and 32 are connected respectively to phase detectors 38 and 40. Each phase detector is supplied with a reference signal from its respective oscillator and the resultant outputs X and Y are used for control purposes.

Thus an image of target 12 focused by optical system 14 on cathode 16 and causing emission from section 29, will produce an amplified beam current that is collected at anode 24. This beam current carries an alternating component that is dependent on the target image location on the cathode.

However, the amplitudes of the modulating signals applied to the different electrodes are preset so that any emission from the center area 28 of the cathode section 29 is unmodulated. If now the target image moves from area 28 toward electrode 18', the beam current will be modulated by the signal +sin $w_2t$ applied to that electrode and the signal collected on anode 24 will carry a component of this frequency and phase. As the target moves back and forth in a horizontal plane from 18' to 18, midway between electrodes 20, 20', the modulation applied to the beam current will vary from +sin $w_2t$ through zero to −sin $w_2t$. Similarly, as the target moves in a vertical direction between electrodes 20 and 20', midway between electrodes 18, 18', the modulation on the beam current will vary from sin $w_1t$ through zero to −sin $w_1t$.

If the target image moves back and forth in a horizontal plane from 18' to 18, but now is closer to grid 20 than to 20' the modulation on the beam current will vary from sin $w_2t$ through zero to −sin $w_2t$ and in addition will have a steady component +sin $w_1t$ of an amplitude depending on the proximity of the target image to grid 20. Similarly, as the the target image moves in a vertical direction between electrodes 20 and 20', but closer to either electrode 18 and 18' the modulation on the beam current will vary from sin $w_1t$ through zero to −sin $w_1t$ with an additional steady component of frequency $w_1$ thereon of an amplitude depending on the proximity of the target image to grid wire 18 or 18'.

Since the frequencies $w_1$ and $w_2$ are different, the two target position modulation components may be separated from each other by filters 30 and 32 yielding independent horizontal and vertical error signals.

The modulated beam current from cathode 16 that has been amplified through electron multipliers 22 is collected at anode 24. By means of line 26, the output signal from anode 24 is applied to filters 30 and 32 where any modulation components on the output signal are separated into their original frequencies. The output of each filter is connected to its corresponding phase detector 38 and 40 respectively, where any modulation component that is present on the filtered signal is detected in any one of many known ways to yield an output whose magnitude is proportional to the signal amplitude and whose polarity is established by the signal phase. Phase detectors 38 and 40 may be any of many known types of synchronous demodulators such as the "Phase-Sensitive Rectifier" described in "Principles of Radar" M.I.T. Radar School Staff, McGraw-Hill, 1952.

Thus, when my device is in the nose of a missile and the missile maintains a course whereby target 12 is in area 28, the missile is "on target," and no correction voltages appear at outputs X and Y. As soon as either the missile or the target deviates from its course sufficiently to place the image outside of area 28, a correction voltage manifests itself at either outputs X or Y depending upon the position of the image with respect to area 28. These correction voltages are then applied to the appropriate control surface to bring the image back to area 28.

The above concept can be readily understood where the image on section 29 is represented as a bright or a light spot on a dark background. Where, for example, my device is to be used in bright daylight, it will be seen that the image on section 29 is dark by comparison to its background. Let us first consider the functioning of my device in broad daylight. In the absence of any image, the bright background light produces uniform emission over section 29. This uniform emission results in no output signals since any modulation of the emitted current introduced by one electrode will be cancelled by modulation impressed on the beam current by the corresponding opposite electrode which electrode has an opposed polarity signal applied thereto. If now a dark spot is presented on an otherwise uniformly emitting screen it will be obvious to those skilled in the art that there will be a modulated signal which does not have a corresponding cancelling modulated signal and thus, a correction voltage will manifest itself on either outputs X or Y or both X and Y.

The use of my device is also possible at times when some background light is present and wherein the image appears as a spot slightly brighter than the background. In this instance, the steady background signal, no matter what level it may have, will cancel itself out and the bright spot will be modulated in accordance with the principles previously stated.

Inequalities of response in the cathode may be compensated by adjustment of relative amplitudes of the signals on the electrodes of each set to yield zero modulation of the output at frequencies $w_1$ and $w_2$ when the cathode is uniformly illuminated. For detection of targets beyond the receptive range of the cathode, optical system 14 may be supplemented by the inclusion of an image converter.

In order to provide a smoother variation of output with target position, more electrodes can be used with proportionally reduced modulating signals. Fig. 3 shows four electrodes in each set, with modulating signals of $\pm\sin w_1t$, $\pm\frac{1}{2}\sin w_1t$, $\pm\sin w_2t$ and $\pm\frac{1}{2}\sin w_2t$. In this manner, the error signal output is made more nearly proportional to the target position.

While I have described what are presently considered the preferred embodiments of my invention, it will be obvious to those skilled in the art that various changes and modifications may be made therein without departing from the inventive concept, and the appended claims are intended to cover all such changes and modifications as fall within the true spirit and scope of my invention.

What is claimed is:

1. A device for indicating position with respect to a viewed object comprising an electron emitting screen, means forming an image of a viewed object on said screen, said screen emitting a stream of electrons only from the area on which said image falls and selective modulation means modulating said electron stream in accordance with the position of said image on said screen, said selective modulation means comprising a first plurality of parallel electrode wires disposed in a plane parallel to said screen and a second plurality of parallel electrode wires perpendicularly disposed with respect to said first plurality of wires in a plane parallel to said first plane, each outermost wire of said first plurality of wires having an opposed polarity signal of a first frequency applied thereto, intermediate wires having a varying phase of said first frequency signal applied thereto and wherein each outermost wire of said second plurality of wires has an opposed polarity signal of a second frequency applied thereto, intermediate wires of said second plurality of wires having a varying phase of said second frequency signal applied thereto.

2. The device of claim 1 wherein said first and said second frequencies applied to said wires modulates said stream of electrons in accordance with the proximity of said stream to any of said wires.

References Cited in the file of this patent

UNITED STATES PATENTS

| | | |
|---|---|---|
| 2,412,822 | Malter | Dec. 17, 1946 |
| 2,425,956 | Salinger | Aug. 19, 1947 |
| 2,431,510 | Salinger | Nov. 25, 1947 |
| 2,433,700 | Larson | Dec. 30, 1947 |
| 2,553,245 | Espenschied | May 25, 1951 |